(12) United States Patent
Sato

(10) Patent No.: US 9,063,675 B2
(45) Date of Patent: Jun. 23, 2015

(54) INFORMATION PROCESSING APPARATUS, INFORMATION PROCESSING METHOD, AND COMPUTER-READABLE RECORDING MEDIUM STORING PROGRAM FOR INFORMATION PROCESSING APPARATUS

(75) Inventor: Hirokazu Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 211 days.

(21) Appl. No.: 13/427,803

(22) Filed: Mar. 22, 2012

(65) Prior Publication Data

US 2012/0243045 A1  Sep. 27, 2012

(30) Foreign Application Priority Data

Mar. 25, 2011  (JP) ................. 2011-067350

(51) Int. Cl.
*G06F 3/12* (2006.01)
*G06K 1/00* (2006.01)

(52) U.S. Cl.
CPC ............ *G06F 3/1204* (2013.01); *G06F 3/1257* (2013.01); *G06F 3/1292* (2013.01)

(58) Field of Classification Search
CPC ... G06F 3/1296; G06F 3/1257; G06F 3/1241; G06F 3/1288; G06F 3/1255; G06F 3/1258
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| | | | |
|---|---|---|---|
| 6,614,550 B1 * | 9/2003 | Minagawa | 358/1.15 |
| 2008/0158597 A1 | 7/2008 | Hashimoto et al. | |
| 2009/0303528 A1 | 12/2009 | Takeuchi et al. | |
| 2011/0038643 A1 * | 2/2011 | Yamaki | 399/8 |

FOREIGN PATENT DOCUMENTS

| | | | |
|---|---|---|---|
| JP | 2007-157077 A | | 6/2007 |
| JP | 2007157077 A | * | 6/2007 |
| JP | 2008-146437 A | | 6/2008 |
| JP | 2008-272939 A | | 11/2008 |
| JP | 2009-049481 A | | 3/2009 |
| JP | 2009-296474 A | | 12/2009 |

OTHER PUBLICATIONS

Japan Patent Office, Notice of Reasons for Rejection for Japanese Patent Application No. 2011-067350 (counterpart to above-captioned patent application), mailed Apr. 9, 2013.

* cited by examiner

*Primary Examiner* — Thierry L Pham
(74) *Attorney, Agent, or Firm* — Baker Botts L.L.P.

(57) ABSTRACT

An information processing apparatus includes a communication unit communicable with a device via an access point which relays communication data and a controller. The controller is configured to store, in a first storage portion, setting information set for a processing in association with identification information of an access point to which the communication unit is connected. The controller is further configured to acquire the identification information of the access point to which the communication unit is connected. The controller is further configured to read the setting information stored in association with the identification information acquired from the first storage portion and to set the processing by using the read setting information.

15 Claims, 12 Drawing Sheets

SETTING INFORMATION MANAGEMENT TABLE 20a

| BSSID | PDF | PHOTO | SCAN |
|---|---|---|---|
| AP1 | DEVICE : (model : MFP-349 10.221.144.143)<br>DETAIL : (A4, color, off, 3) — 66<br>TIME : 2010/01/30 11:34 | SETTING INFORMATION 1b | SETTING INFORMATION 1c |
| AP2 | SETTING INFORMATION 2a | SETTING INFORMATION 2b | SETTING INFORMATION 2c |
| AP3 | SETTING INFORMATION 3a | SETTING INFORMATION 3b | SETTING INFORMATION 3c |

Fig. 2

SETTING INFORMATION MANAGEMENT TABLE 20a

| BSSID | PDF | PHOTO | SCAN |
|---|---|---|---|
| AP1 | DEVICE : (model : MFP-349 10.221.144.143)<br>DETAIL : (A4, color, off, 3)<br>TIME : 2010/01/30 11:34 | SETTING INFORMATION 1b | SETTING INFORMATION 1c |
| AP2 | SETTING INFORMATION 2a | SETTING INFORMATION 2b | SETTING INFORMATION 2c |
| AP3 | SETTING INFORMATION 3a | SETTING INFORMATION 3b | SETTING INFORMATION 3c |

Fig. 5A

| Printer | MFC-6890CDW |
| Paper Sise | A4 |
| Color / Mono | Color |
| Duplex | OFF |
| Copies | 1 |

Fig. 5B

| Printer | MFC-6890CDW |
| Paper Sise | — |
| Color / Mono | — |
| Duplex | — |
| Copies | — |

Fig. 5C

| Printer | — |
| Paper Sise | A4 |
| Color / Mono | Color |
| Duplex | OFF |
| Copies | 1 |

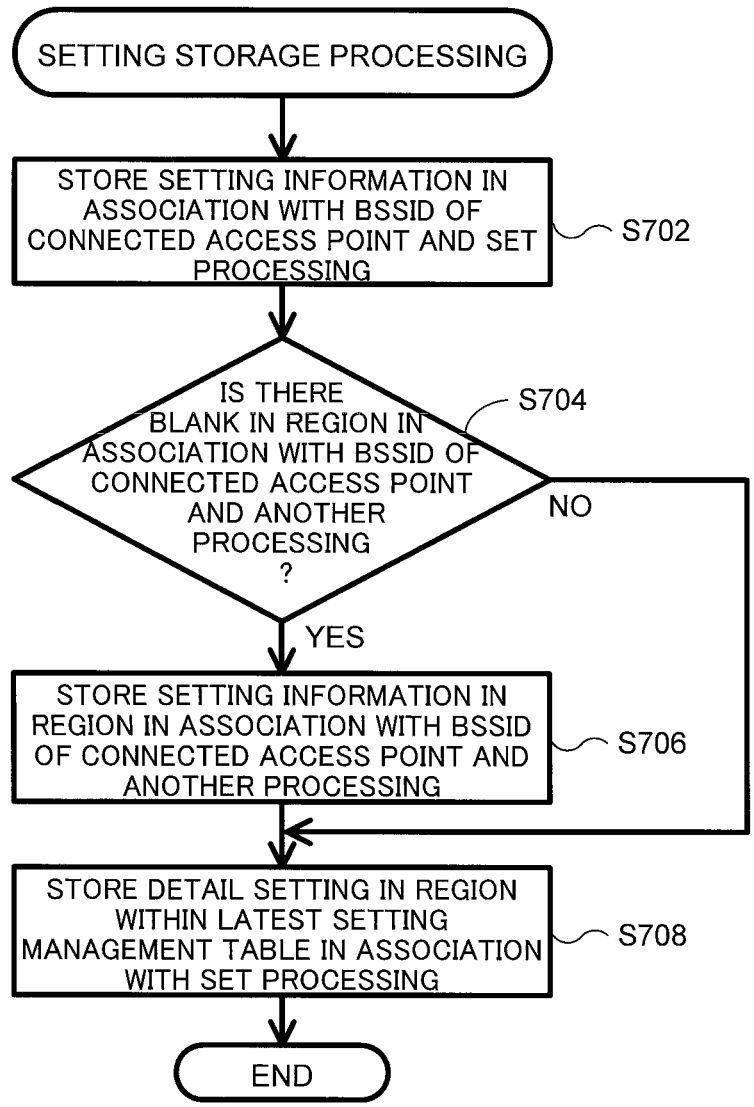

INFORMATION PROCESSING APPARATUS, INFORMATION PROCESSING METHOD, AND COMPUTER-READABLE RECORDING MEDIUM STORING PROGRAM FOR INFORMATION PROCESSING APPARATUS

CROSS REFERENCE TO RELATED APPLICATION

This application claims priority from Japanese Patent Application No. 2011-067350, which was filed on Mar. 25, 2011, the entire subject matter of which is incorporated herein by reference.

BACKGROUND

1. Technical Field

The present invention relates to an information processing apparatus, an information processing method and a computer-readable recording medium storing a program for an image forming apparatus.

2. Related Art

A personal computer which memorize, for each access point, a default printer to be presented to a user as a commonly-used printer is known.

However, the personal computer presents only the memorized default printer to the user regardless of how the user uses the printer in practice. Therefore, a workload on the user, which is needed for various settings required to cause a device to perform processing, may not be reduced sufficiently. For example, when a printer memorized as default is different from a printer that the user wants to use, it is necessary for the user to change the setting from the presented default printer to the printer every time when the user executes printing.

SUMMARY

A need has arisen to provide an information processing apparatus and an information processing method by which appropriate setting information may be set while reducing a work load on a user.

According to an embodiment of the invention, an information processing apparatus comprises a communication unit communicable with a device via an access point which relays communication data and a controller. The controller is configured to store, in a first storage portion, setting information set for a processing in association with identification information of an access point to which the communication unit is connected. The controller is further configured to acquire the identification information of the access point to which the communication unit is connected. The controller is further configured to read the setting information stored in association with the identification information acquired from the first storage portion and to set the processing by using the read setting information.

According to an embodiment of the invention, an information processing method for an information processing apparatus, which comprises a communication unit communicable with a device via an access point which relays communication data, comprises a step of storing, in a first storage portion, setting information set for a processing in association with identification information of an access point to which the communication unit is connected. The information processing method further comprises a step of acquiring the identification information of the access point to which the communication unit is connected. The information processing method further comprises a step of reading the setting information stored in association with the identification information acquired from the first storage portion and a step of setting the processing by using the read setting information.

According to an embodiment of the invention, a non-transitory computer-readable recording medium is storing a program for an information processing apparatus which comprises a communication unit communicable with a device via an access point which relays communication data. The program, when executed by a processor, causes the information processing apparatus to execute a first storing step of storing, in a first storage portion, setting information set for a processing in association with identification information of an access point to which the communication unit is connected. The program, when executed by the processor, causes the information processing device to further execute a first acquiring step of acquiring the identification information of the access point to which the communication unit is connected. The program, when executed by the processor, causes the information processing device to still further execute a first reading step of reading the setting information stored in association with the identification information acquired from the first storage portion and a first setting step of setting the processing by using the read setting information.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIG. 2 is a diagram schematically showing the configuration of a setting information management table;

FIGS. 5A to 5C are diagrams each showing a setting screen displayed on an LCD of the portable terminal;

FIG. 7A is a diagram showing an example of a latest setting management table that is generated by a portable terminal of a third embodiment, and FIG. 7B is a flow chart showing setting storage processing performed in the portable terminal of the third embodiment;

DETAILED DESCRIPTION OF THE PREFERRED EMBODIMENTS

Figure 1:
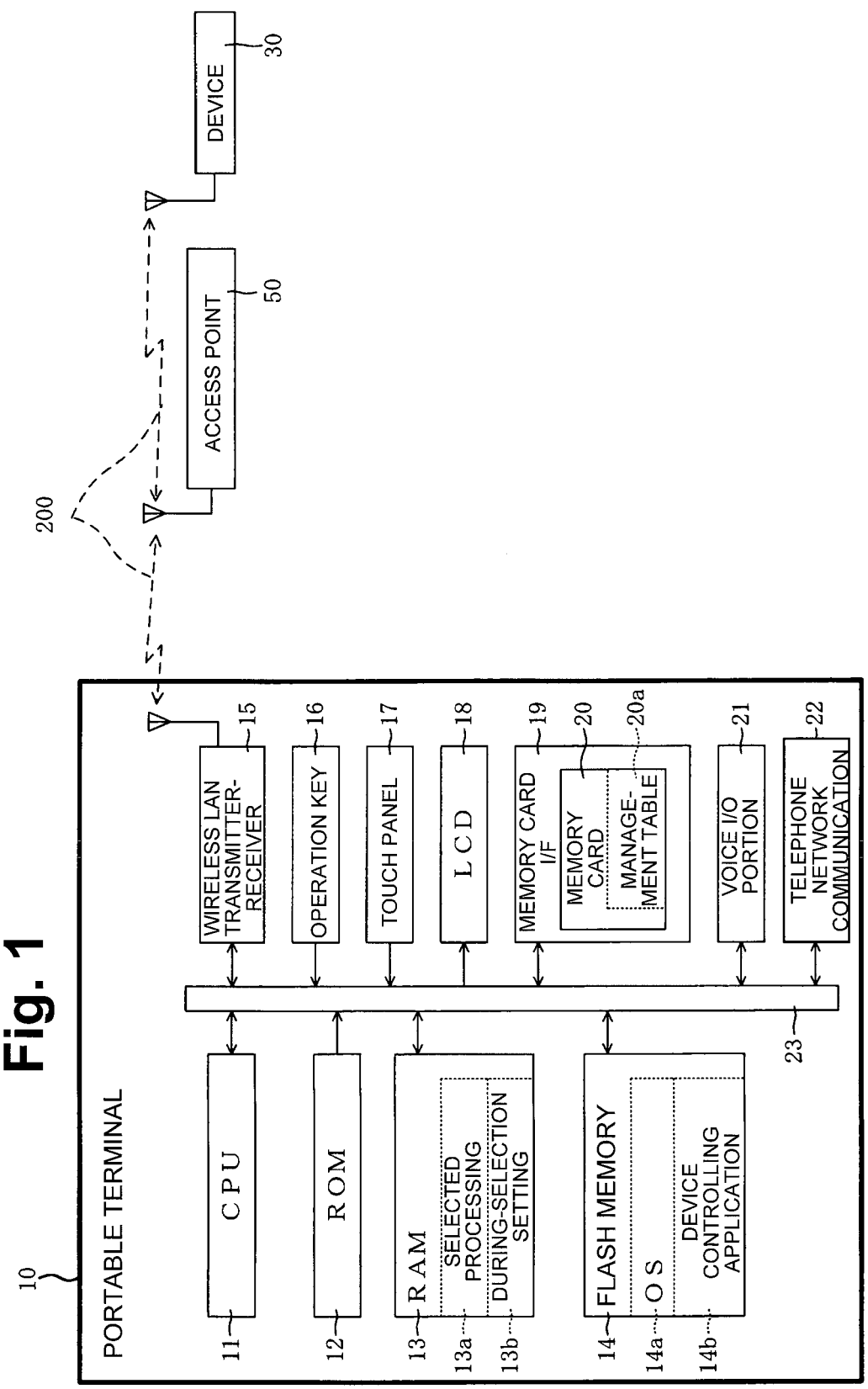
FIG. 1 is a block diagram showing the electrical configuration of a portable terminal including a device controlling application of a first embodiment.

Embodiments of the invention and their features and advantages may be understood by referring to FIGS. 1-10, like numerals being used for like corresponding parts in the various drawings. Hereinafter, an embodiment of the invention will be described by appropriately referring to the drawings. Further, the embodiment to be described below is merely an example of the invention, and may be, of course, appropriately modified within the scope in which the concept of the invention is not changed.

FIG. 1 is a block diagram showing the electrical configuration of a portable terminal 10 including a device controlling application 14b (hereinafter referred to as the application 14b) of a first embodiment of the invention. The application 14b allows a print function and a scan function of a device 30 to be used from the portable terminal 10 without the intervention of a personal computer or the like. Particularly, using the application 14b allows appropriate setting information to be set while reducing a work load on a user, which is needed when printing and scanning are set.

The portable terminal 10 is a mobile phone used for voice communication with another device through a radio base station not shown. Further, the portable terminal 10 performs a radio communication 200 with another device in an infrastructure mode through an access point 50. The portable terminal 10 includes a CPU 11, a ROM 12, a RAM 13, a flash memory 14, a wireless LAN transmitter-receiver 15 (an example of a communication unit), an operation key 16, a touch panel 17, a liquid crystal display 18 (hereinafter referred to as an LCD 18), a memory card interface 19 (hereinafter referred to as a memory card I/F 19), a voice input/output portion 21 and a telephone network communication portion 22, which are connected through a bus line 23 to communicate with one another.

The CPU 11 controls each portion connected to the bus line 23 according to fixed values or programs stored in the ROM 12 or the like, or various signals transmitted and received through the radio communication 200. The ROM 12 is a non-writable memory and stores various fixed values. The RAM 13 is a rewritable volatile memory and includes a selected processing memory 13a and a during-selection setting memory 13b. The selected processing memory 13a stores processing selected by the user among PDF printing, photo-printing and scanning that can be performed by the device 30 based on the functions of the application 14b. The during-selection setting memory 13b stores setting information related to processing performed by the device 30.

The flash memory 14 is a rewritable nonvolatile memory and stores an operating system 14a (hereinafter referred to as an OS 14a) and the application 14b. In the present embodiments, the OS 14a is basic software incorporated into the portable terminal 10, and may be the Android (registered trademark) OS in the present embodiments. Further, the application 14b may be provided by a vendor of the device 30, and may be installed in the portable terminal 10 by a user of the portable terminal 10. Hereinafter, the CPU 11 (an example of a processor) executing a program such as an application or an operation system may be described by only a name of a program. For example, an "application" may mean "the CPU 11 executing an application".

Each application (including the application 14b) installed in the portable terminal 10 may call an API of the OS 14a and may output to the OS 14a data to be delivered to each component of the portable terminal 10, such as the wireless LAN transmitter-receiver 15, the operation key 16, the touch panel 17, the LCD 18, the memory card I/F 19, the voice input/output portion 21 and the telephone network communication portion 22. That is to say, each application may call the API of the OS 14a to control each component of the portable terminal 10. Further, each application may call the API of the OS 14a and may acquire from the OS 14a, data output by each component of the portable terminal 10 and data indicating a state of each component. That is to say, each application may call the API of the OS 14a to acquire from the OS 14a, data indicating the state of each component of the portable terminal 10 (including a state of an operation input to the portable terminal 10). In addition, the OS 14a may sometimes notify each application of data output by each component of the portable terminal 10 and data indicating the state of each component regularly or every time the state of each component is changed. That is to say, each application may receive the notice from the OS 14a, and may acquire from the OS 14a the data indicating the state of each component of the portable terminal 10 (including the state of the operation input to the portable terminal 10).

The wireless LAN transmitter-receiver 15 (an example of a communication unit) may be a circuit for connecting via Wi-Fi (registered trademark) the portable terminal 10 with other devices through a wireless LAN compliant with the IEEE802.11b/g standard. The wireless LAN transmitter-receiver 15 may allow for the radio communication 200 between the portable terminal 10 and the access point 50.

The operation key 16 may be a hard key provided on a housing, not shown, of the portable terminal 10, and may be used to enter setting information and instructions into the portable terminal 10. The touch panel 17 may be superimposed on the LCD 18 and may be used to enter setting information and instructions into the portable terminal 10. The LCD 18 may display a list of icons indicating applications installed in the portable terminal 10, and a screen of a launched application. The memory card I/F 19 may be an interface in which a nonvolatile memory card 20 can be inserted, and may control the writing or reading of data to/from the memory card 20. The memory card 20 may include a setting information management table 20a. The setting information management table 20a will be described later with reference to FIG. 2. An example of the memory card 20 may be an SD card (registered trademark). The voice input/output portion 21 may be a device for inputting/outputting voice, such as a microphone or a speaker, and the telephone network communication portion 22 may be a circuit for performing telephone communication with another telephone.

The device 30, which may be a multi-function machine having a printer function, a scan function, a copy function and the like, may include a wireless LAN transmitter-receiver (not shown) which has the similar configuration to the wireless LAN transmitter-receiver 15 of the portable terminal 10, and may be connected via Wi-Fi to the portable terminal 10 through radio communication mediated by the access point 50. Further, the device 30 may be controlled by the application 14b of the portable terminal 10 to print an image based on the data that may be transmitted from the portable terminal 10 or to read a manuscript to generate image data and transmit the data to the portable terminal 10. The access point 50 may relay the communication between Wi-Fi terminals.

The access point 50 may relay the communication between the Wi-Fi terminals, and a BSSID (Basic Service Set Identifier) serving as identification information may be set therefor by an administrator. The portable terminal 10 may detect the access point 50 that is presented within a range where the radio communication 200 is possible, so that the portable terminal 10 instructs the device 30 which is allowed to communicate through the detected access point 50 to perform printing or scanning. Note that there may be one or more devices available through the access point 50 other than the device 30. However, in this embodiment, only one device 30 is shown as a device available through the access point 50 in order to make the present invention easier to understand.

FIG. 2 is a diagram schematically showing the configuration of the setting information management table 20a. The setting information management table 20a may store setting information 60 in association with a BSSID 61 of the access point 50 and a processing type 62 that is instructed to the device 30. This setting information management table 20a may be generated by the application 14b and may be stored in the memory card 20. Note that the BSSID 61 may be constituted by a 48-bit number; but, in FIG. 2, the BSSID is represented by a simple character string. Further, the processing type 62 may represent the type of processing that may be instructed to the device 30 by the application 14b. In the present embodiment, the processing type 62 may includes PDF printing, photo-printing and scanning.

The setting information 60 indicates setting information set for each processing, and may include device information 64 (an example of specifying information) and a detail setting 66. The device information 64 may be used to specify the device 30, and may include a model name and an IP address of the device 30. The detail setting 66 may include setting values of various items related to processing performed by the device 30, for example, paper size, color printing/monochrome printing, presence of duplex printing, and the number of print copies.

When a user activates the application 14b with the portable terminal 10 connected to one of the access points 50, the application 14b may prompt the user to select processing to be performed by the device 30 or to set the device information 64 and the detail setting 66, which will be described in detail later with reference to the flow chart of FIG. 3. Then, the application 14b may instruct the device 30 specified by the device information 64 among the devices 30 available through the connected access point 50 to perform the processing selected by the user.

In addition, the application 14b may store in the setting information management table 20a the device information 64 and the detail setting 66 set by the user in association with the BSSID 61 of the connected access point 50 and the processing type 62 selected by the user. When the portable terminal 10 is connected to the access point 50 again to which the portable terminal 10 was connected in the past, and the user selects the same processing as that was selected by the user when the portable terminal 10 was connected to the access point 50 in the past, the application 14b may use the setting information 60 stored in the setting information management table 20a to reduce the work load on the user, which may be needed for the setting operation of the device information 64 and the detail setting 66. Note that the setting information 60 may include time information 68 indicating a date and time when the setting information 60 is stored in the setting information management table 20a.

Figure 3:
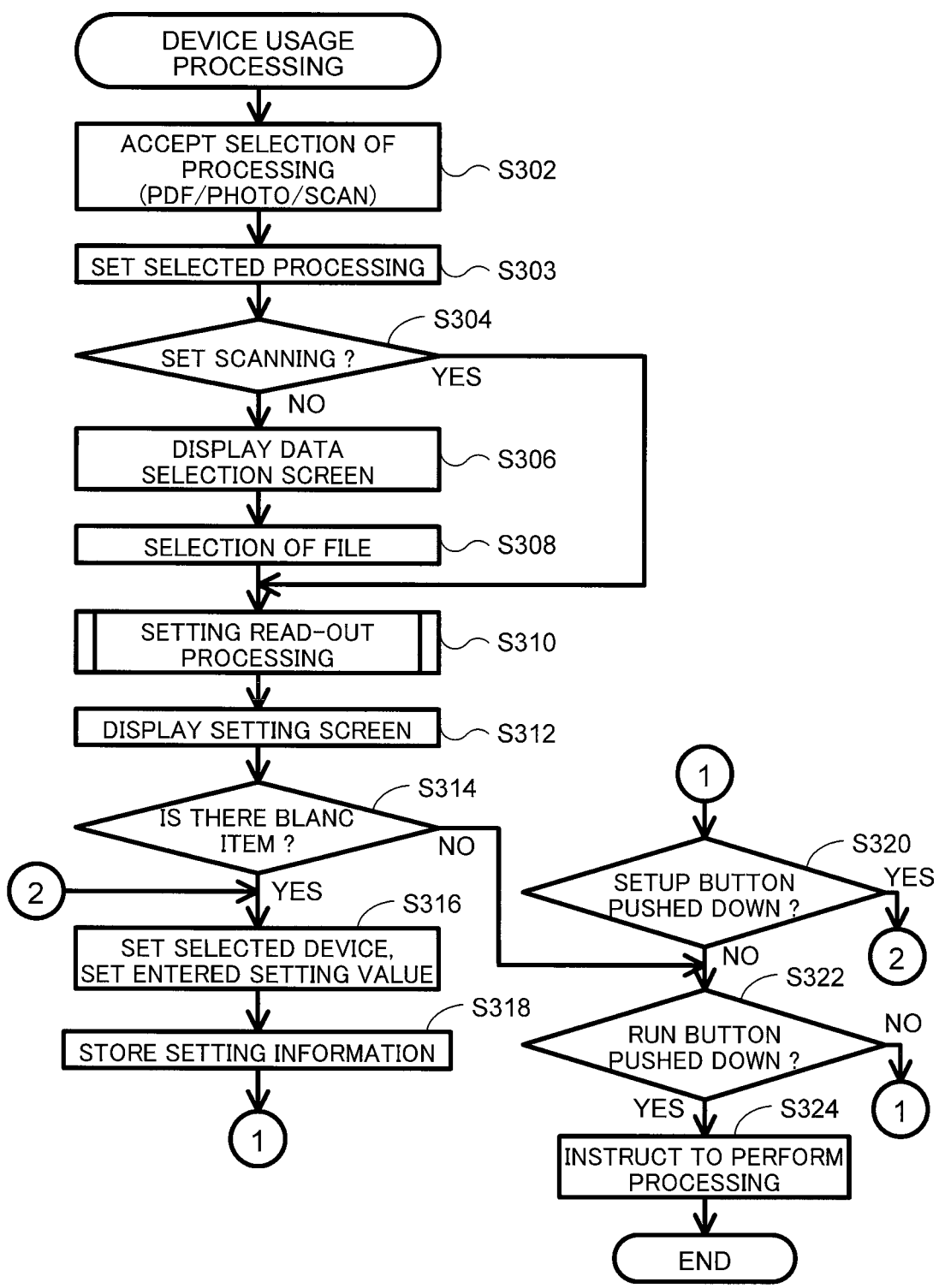
FIG. 3 is a flow chart showing a device usage processing performed in the portable terminal of the first embodiment.

FIG. 3 is a flow chart showing a device usage processing performed by the CPU 11 of the portable terminal 10 according to the application 14b. This processing may be performed when the user activates the application 14b in the portable terminal 10. However, before this processing is started, the portable terminal 10 may be connected via Wi-Fi to one of the access points 50. Note that each step shown in the flow charts of FIGS. 3, 4 and 6 to 9 described below will be described in such a way that the application 14b causes the CPU 11 to perform or that the application 14b uses a function of the OS 14a and the like to cause the CPU 11 to perform. However, some steps included in each flow chart may be replaced with steps that the OS 14a and other applications cause the CPU 11 to perform. Further, without intervention of the CPU 11, some steps may be replaced with steps implemented by operating hardware itself, e.g., ASIC, provided on the portable terminal 10.

First, in step S302 (hereinafter, "step" may be omitted), the CPU 11 (an example of a processor) may cause the LCD 18 to display icons corresponding to PDF printing, photo-printing, and scanning, respectively, to accept the selection of processing (S302). More specifically, when the CPU 11 recognizes whether or not an electric signal corresponding to a region where one of the icons corresponding to one of PDF printing, photo-printing, and scanning is displayed is entered from the touch panel 17, and, if the corresponding electric signal is entered from the touch panel 17, the CPU 11 may determine that the selection of processing indicated by the icon displayed in the region corresponding to the entered electric signal has been accepted. Then, the CPU 11 may set the processing indicated by the icon touched by the user in the selected processing memory 13a (S303). When the processing set in the selected processing memory 13a (hereinafter referred to simply as set processing) is PDF printing or photo-printing (S304: No), the CPU 11 may cause the LCD 18 to display a data selection screen (S306). When the processing set in the selected processing memory 13a is PDF printing, the LCD 18 may display the data selection screen listing icons of PDF format files (hereinafter referred to as PDF files) among data stored in the memory card 20. On the other hand, when the set processing is photo-printing, the LCD 18 may display the data selection screen listing thumbnails of image files. e.g., JPEG format files (hereinafter referred to as JPEG files), among data stored in the memory card 20.

Then, when the user touches one of the icons or one of the thumbnails displayed on the data selection screen, an electric signal corresponding to the region touched on the touch panel 17 by the user may be entered into the CPU 11. When the electric signal is entered from the touch panel 17, the CPU 11 may determine that a file specified by the icon or the thumbnail displayed in the region corresponding to the entered electric signal is entered as a file that is to be processed (S308). Note that when processing for scanning is entered (S304: Yes), the CPU 11 skips processing of S306 and S308. Next, the CPU 11 performs setting read-out processing (S310).

Figure 4:
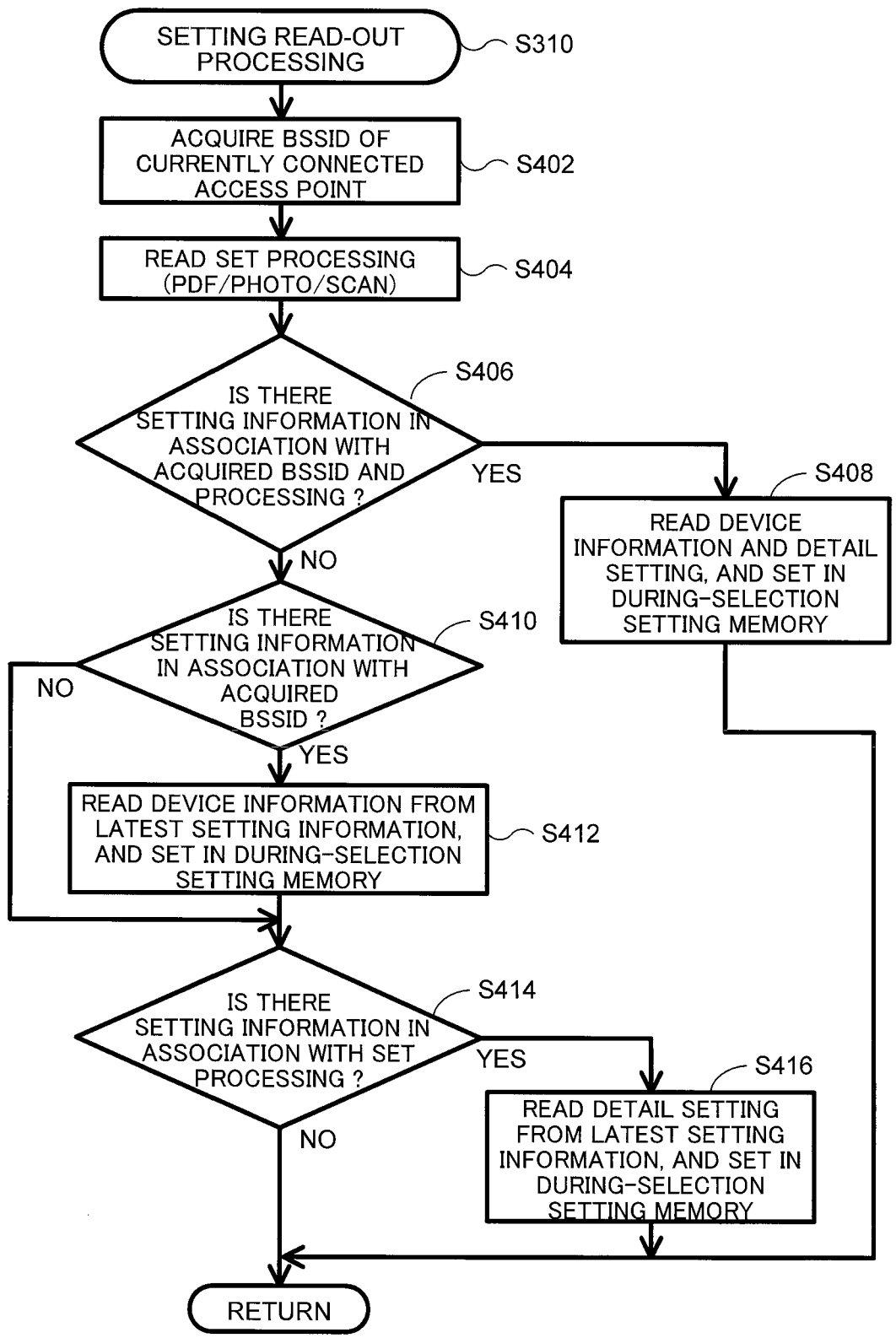
FIG. 4 is a flow chart showing setting read-out processing performed in the portable terminal of the first embodiment.

FIG. 4 is a flow chart showing an example of the setting read-out processing (S310). First, the CPU 11 may acquire through the wireless LAN transmitter-receiver 15 the BSSID of one of the access points 50 connected via the wireless LAN transmitter-receiver 15 (S402), and reads the processing set in S303 from the selected processing memory 13a (S404).

Next, when the setting information 60 in association with the acquired BSSID 61 and the set processing type 62 is stored in the setting information management table 20a (S406: Yes), the CPU 11 may read from the setting information management table 20a the setting information 60 stored in association with the acquired BSSID 61 and the set processing type 62, and may set the device information 64 and the detail setting 66 included in the setting information 60 in the during-selection setting memory 13b (S408). Then, the CPU 11 may return to the processing of S312 (see FIG. 3).

Meanwhile, when no setting information 60 in association with the acquired BSSID 61 and the set processing type 62 is stored in the setting information management table 20a (S406: No), but there is the setting information 60 in association with the BSSID 61 of one of the connected access points 50, and another processing type 62 that is different from the set processing (S410: Yes), the CPU 11 may read the device information 64 from the setting information 60 in association with the BSSID 61 of the one of the connected access points 50, and the another processing type 62 that is different from the set processing, and may set in the during-selection setting memory 13b (S412). Note that when plural pieces of the setting information 60 are stored in association with the connected BSSID 61, the CPU 11 may select, from among the plural pieces of setting information 60, the latest setting information 60 stored in the setting information management table 20a based on the time information 68, and may set the device information 64 included in the setting information 60 in the during-selection setting memory 13b. Meanwhile, if there is no setting information 60 in association with the BSSID 61 of the one of the connected access points 50 (S410: No), the CPU 11 skips the processing of S412.

Next, the setting information 60 in association with the acquired BSSID 61 and the set processing type 62 is not stored in the setting information management table 20a (S406: No), but the setting information 60 in association with the BSSID 61 of another access point that is different from one of the connected access points 50, and the set processing type 62 is stored in the setting information management table 20a (S414: Yes), the CPU 11 may read the detail setting 66 from the setting information 60 in association with the BSSID 61 of the other access point, and the set processing type 62, and may set the detail setting 66 in the during-selection setting memory 13b (S416). Note that when plural pieces of the setting information 60 in association with the set processing type 62 are stored, the CPU 11 may select the latest setting information 60 stored in the setting information management table 20a based on the time information 68 from among the plural pieces of setting information 60, and may set the detail setting 66 thereof in the during-selection setting memory 13b. Meanwhile, when the setting information 60 in association with the set processing type 62 is not stored in the setting information management table 20a (S414: No), the CPU 11 skips the processing of S416.

Returning to FIG. 3, the description is continued. Next, the CPU 11 may cause the LCD 18 to display a setting screen (S312). The setting screen may be configured to accept an input of selection of the device information 64 and the detail setting 66. However, if the device information 64 or the detail setting 66 read from the setting information management table 20a is set in the during-selection setting memory 13b in the setting read-out processing (S310), the setting screen may be displayed with the device information 64 or the detail setting 66 set.

FIG. 5A is a diagram showing an example of the setting screen. As shown in FIG. 5A, the setting screen may include a device setting item 70 and a detail setting item 72. When the device information 64 read from the setting information management table 20a has been stored in the during-selection setting memory 131), in the application 14b, the device information 64 may be displayed in the device setting item 70. Similarly, when the detail setting 66 read from the setting information management table 20a has been stored in the during-selection setting memory 13b, the detail setting 66 may be displayed in the detail setting item 72.

That is to say, if the access point 50 that was connected in the past is connected again, and the setting information 60 in association with the processing accepted when the access point 50 was connected in the past is left in the setting information management table 20a, when the same processing is accepted, the device information 64 and the detail setting 66 that were set previously may be inherited, and may be displayed in the setting screen as shown in FIG. 5A.

Therefore, from the standpoint of the user, since a setting operation can be started from a situation where the appropriate device information 64 and detail setting 66 that are adapted to surrounding environments are set, the work load on the user may be reduced. For example, after instructing the device 30 to perform PDF printing from one access point 50, the user moves to another access point 50, and sets the device information 64 for specifying another device available to the other access point 50 and the detail setting 66 appropriate to the properties and functions of the other device. Then, when the user returns to the original access point 50 and instructs PDF printing again, the device information 64 and the detail setting 66 which were set when the original access point 50 was connected in the past may be inherited and used.

FIG. 5B shows an example of a setting screen to be displayed on the LCD 18 when the device information 64 in association with the BSSID 61 of the connected access point 50 and the processing type 62 that is different from set processing are read and stored in the during-selection setting memory 13b (S412). In this case, the device information 64 in association with the BSSID 61 of the connected access point 50 is displayed in the device setting item 70, but a setting value of the detail setting item 72 is blank.

The setting screen shown in FIG. 5B is a setting screen displayed in a case where the user, when connected again to the access point 50 which was connected in the past, selects processing that is different from when the user was connected to the access point 50 in the past. According to the setting screen shown in FIG. 5B, the user can start a setting operation from the situation where the device information 64 that was set when the user was connected to the access point 50 in the past, namely, the device information 64 of the device 30 which is more likely to be used via the currently connected access point 50 has already been set. Thus, the work load on the user, which is needed for the setting operation, may be reduced.

FIG. 5C shows an example of a setting screen to be displayed on the LCD 18 when the detail setting 66 in association with the BSSID 61 of another access point 50 that is different from the connected access point 50 and the set processing type 62 is read and stored in the during-selection setting memory 13b (S416). In this case, the detail setting 66 in association with the set processing type 62 is displayed in the detail setting item 72, but a setting value of the device setting item 70 is blank.

The setting screen shown in FIG. 5C is a setting screen displayed in the case where the user connects to one access point 50 for the first time, when the user selects processing selected via another access point 50. According to the setting screen shown in FIG. 5C, the user can start a setting operation from the situation where the detail setting 66 that was set when the user selected the processing in the past, namely, the detail setting 66 which is more likely to be set in connection with the currently set processing has already been set. Thus, the work load on the user, which is needed for the setting operation, may be reduced.

Particularly, in the present embodiment, as printing processing, PDF printing for printing a PDF file and photo-printing for printing a JPEG file may be provided. Between printing the PDF file and printing the JPEG file, the most suitable detail setting 66 may differ, for example, in the selection of the paper size or the selection of color printing/monochrome printing. According to the present embodiment, since the setting information 60 is stored for each of the PDF printing and the photo-printing, the detail setting 66 appropriate to the set processing type may be set while reducing the work load on the user.

Returning to FIG. 3, the description is continued. Next, when in a setting item, there is no blank item (item where no setting value is set) (S314: No), and when an instruction to execute processing is entered by pushing down a run button (not shown) (S322: Yes), the CPU 11 may instruct the device 30 specified by the device information 64 set in the during-selection setting memory 13b to perform the processing selected by the user based on the detail setting 66 (S324), and finishes the device usage processing.

Note that the run button may be the operation key 16 which may be a hard key, or may be a soft key (not shown) displayed on the setting screen. The CPU 11 may determine whether or not the run button is pushed down based on the electric signal entered through the operation key 16 or the electric signal corresponding to the region where the soft key entered through the touch panel 17 is displayed.

Meanwhile, in the setting item, when there is a blank item (S314: Yes), the CPU 11 may accept an input of a selection of the device 30 and a setting value of the processing (S316). Specifically, the following processing may be performed. When the selection of the device 30 is accepted, the CPU 11 may cause the LCD 18 to display the icon indicating the device 30 connected to the access point 50. Then, when the user selects the device and touches the icon thereof, the electric signal corresponding to the region where the icon is displayed on the LCD 18 may be entered into the CPU 11 from the touch panel 17. When the electric signal is entered, the CPU 11 may determine that the device indicated by the icon displayed in the region corresponding to the entered electric signal is selected by the user. The processing in the case where the input of the setting value is accepted may be similarly performed. The CPU 11 may cause the LCD 18 to display the icon of the setting value for each item. When the electric signal corresponding to the region where the icon is displayed on the LCD 18 is entered from the touch panel 17, the CPU 11 may determine that the setting value indicated by the icon displayed in the region corresponding to the entered electric signal is entered by the user. Then, the CPU 11 may set the device information 64 of the device 30 selected by the user in the during-selection setting memory 13b, or the entered setting value (detail setting 66) in the during-selection setting memory 13b. Note that when any device information 64 or detail setting 66 has been already stored in the during-selection setting memory 13b, it may be updated (changed). Next, the CPU 11 may store in the setting information management table 20a, the setting information 60 including the device information 64, the detail setting 66, and the time information 68 representing the current date and time which have been set in the during-selection setting memory 13b in association with the BSSID 61 of the connected access point 50 and the set processing type 62 (S318). That is to say, the latest setting information 60 may be stored in the setting information management table 20a at any time.

Next, when a setup key is pushed down (S320: Yes), the CPU 11 may repeat the processing from S316 onward. Note that the setup key may be the operation key 16 which may be a hard key, or may be a soft key (not shown) displayed on the setting screen. When the setup key is not pushed down (S320: No), and when the run button is not pushed down (S322: No), the CPU 11 may repeat the processing from S320 onward. Then, when the run button is pushed down while the processing is repeated, (S322: Yes), the CPU 11 may instruct the device 30 specified by the device information 64 set in the during-selection setting memory 13b to perform the processing selected by the user based on the detail setting 66 (S324), and finishes the device usage processing.

According to the application 14b of the first embodiment, the device information 64 and the detail setting 66 which were set in the during-selection setting memory 13b in the past may be inherited, thus the work load on the user, which is needed for the setting operation, may be reduced.

Other embodiments of the present invention will now be described. In each embodiment which will be described below, since the electrical configurations of the portable terminal 10 and the device 30 may be the same as those described in the first embodiment, the same reference symbols as those in the first embodiment are assigned thereto and the description thereof will be omitted.

Figure 6A:
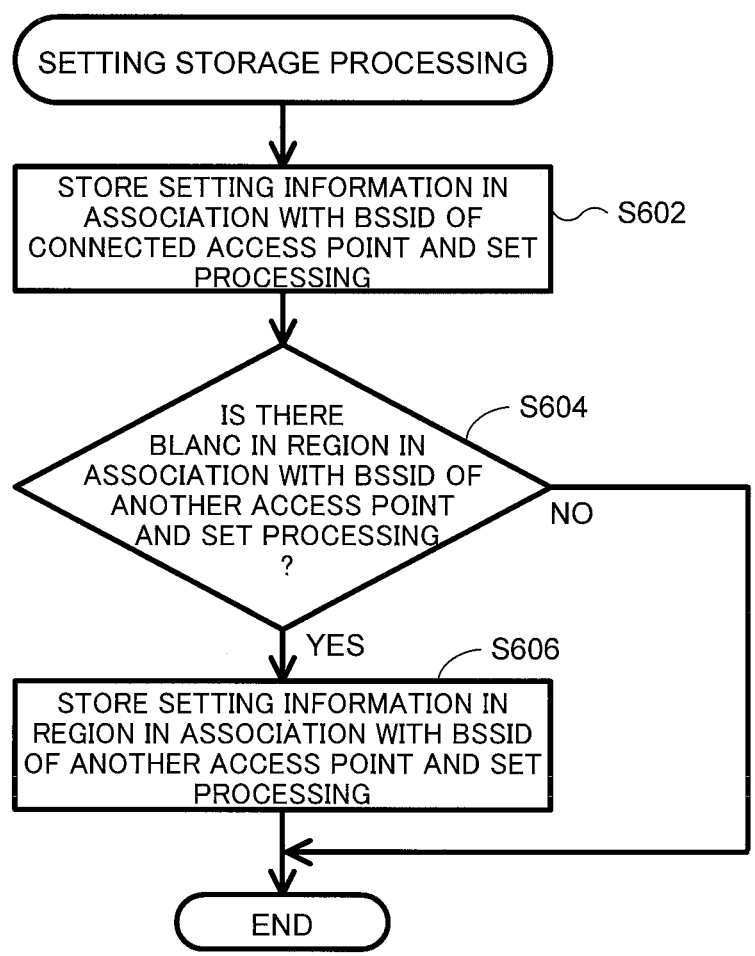
FIG. 6A is a flow chart showing setting storage processing performed in a portable terminal of a second embodiment.
Figure 6B:
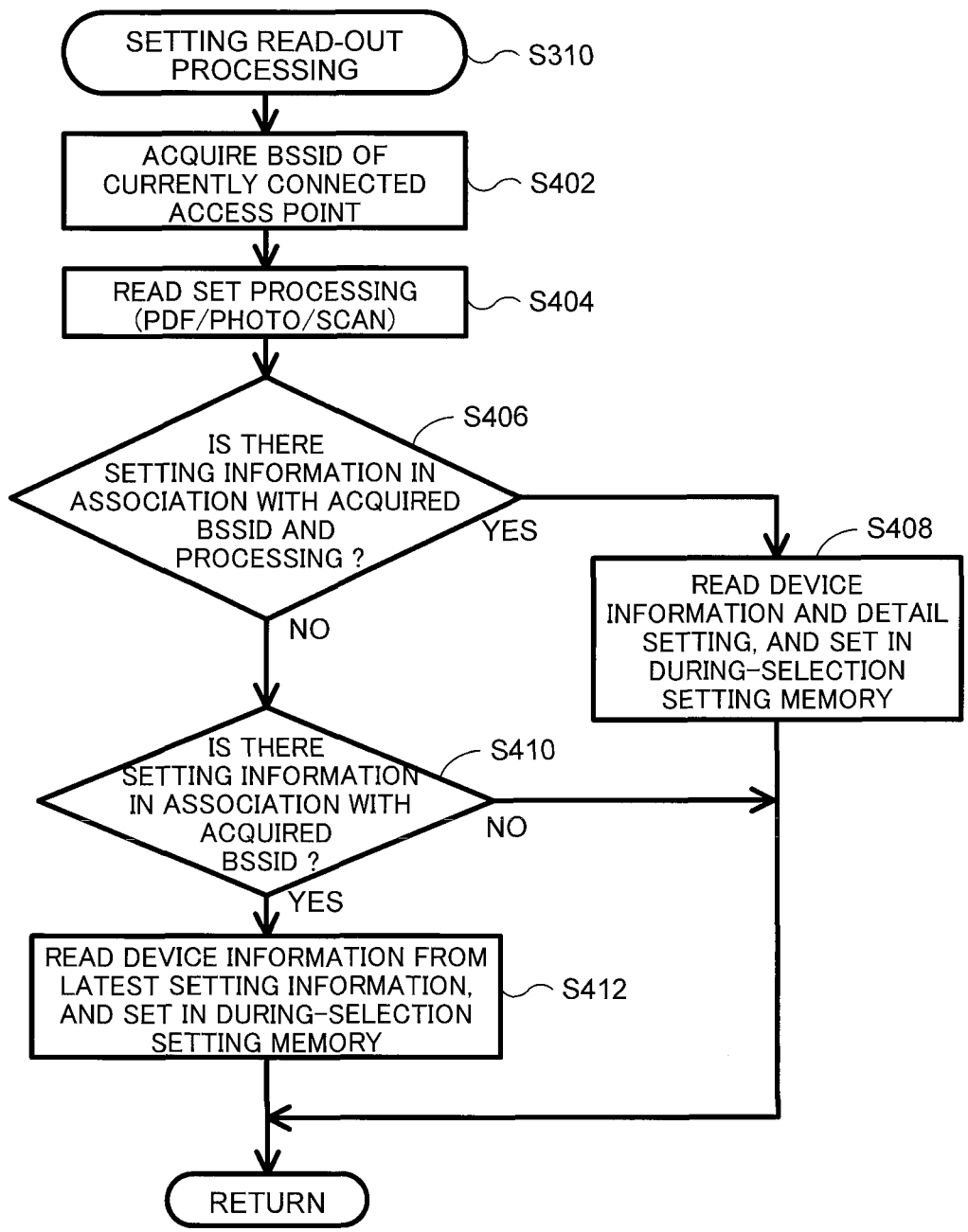
FIG. 6B is a flow chart showing setting read-out processing performed in the portable terminal of the second embodiment.

FIGS. 6A and 6B show the processing performed by the CPU 11 according to the application 14b of a second embodiment, FIG. 6A being a flow chart showing an example of setting storage processing, FIG. 6B being an example of a flow chart showing setting read-out processing. The application 14b of the second embodiment may cause the CPU 11 to perform the setting storage processing shown in FIG. 6A instead of S318 in the device usage processing of the first embodiment. In addition, the application 14b of the second embodiment may cause the CPU 11 to perform the setting read-out processing shown in FIG. 6B instead of the setting read-out processing of the first embodiment (S310). Other processing which the application 14b of the second embodiment causes the CPU 11 to perform may be similar to that of the first embodiment. Note that, in the second embodiment, the same reference symbols as those in the first embodiment are assigned to the same processing as that described in the first embodiment and the drawings and the description thereof will be omitted.

The setting storage processing shown in FIG. 6A may be performed every time when the device information 64 or the detail setting 66 stored in the during-selection setting memory 13b are updated because of acceptance in the setting screen of the selection of the device 30 or the input of the setting value. In this setting storage processing, the CPU 11 may first cause the setting information 60 to be stored in the setting information management table 20a in association with the BSSID 61 of the connected access point 50 and the processing type 62 set in the during-selection setting memory 13b (hereinafter referred to as set processing as in the first embodiment) (S602).

Next, if, in the setting information management table 20a, within the region in association with the BSSID 61 of another access point 50 that is different from the connected access point 50, and the set processing type 62, there is a blank region, in other words, if, within the region in association with the set processing type 62, there is a region where no setting information 60 has been stored (S604: Yes), the CPU 11 may cause the setting information 60 including the detail setting 66 set in the during-selection setting memory 13b to be stored in the blank region (S606). That is to say, the setting information 60 may be stored in association with the BSSID of the other access point 50 and set processing. However, here, the setting information 60 that is to be stored may include the detail setting 66 and the time information 68, but not device information 64. Note that if, in the setting information management table 20a, within the region in association with the BSSID 61 of another access point 50 that is different from the connected access point 50 and the set processing type 62, there is no blank region (S604: No), the CPU 11 skips the processing of S606.

FIG. 6B is a flow chart showing an example of the setting read-out processing (S310) performed by the CPU 11 of the portable terminal 10 of the second embodiment. This setting read-out processing (S310) may be performed instead of the setting read-out processing (S310) of the first embodiment, which is different from that of the first embodiment in that the processing of S414 and the processing of S416 included in the setting read-out processing of the first embodiment are not included.

That is to say, as described with reference to FIG. 6A, in the second embodiment, when the setting information 60 is stored in association with the BSSID 61 of the connected access point 50 and the set processing type 62, the setting information 60 of another access point 50 may be also stored. Thus, according to the setting read-out processing of the second embodiment, even if processing is to be set for the first time at one access point 50, when setting processing set in another access point 50 in the past, the detail setting 66 set for the same processing in the past may be read from the setting information management table 20a and inherited as the setting information 60 in association with the connected access point 50.

Therefore, according to the setting read-out processing of the second embodiment, unlike the first embodiment, processing may be finished without determining whether or not there is the setting information 60 in association with the BSSID 61 of the other access point 50 and the set processing (i.e. processing of S414 and processing of S416 are omitted). According to the application 14b of the second embodiment, the work load on the user, which is needed for the setting operation, may be reduced.

A third embodiment will be described with reference to FIGS. 7A and 7B, and FIG. 8. FIG. 7A is a drawing showing an example of the configuration of a latest setting management table 20b that is generated by the application 14b of the third embodiment in the memory card 20. As shown in FIG. 7A, the latest setting management table 20b may store the latest detail setting 66 that is set for each processing in association with the processing type 62.

Figure 8:
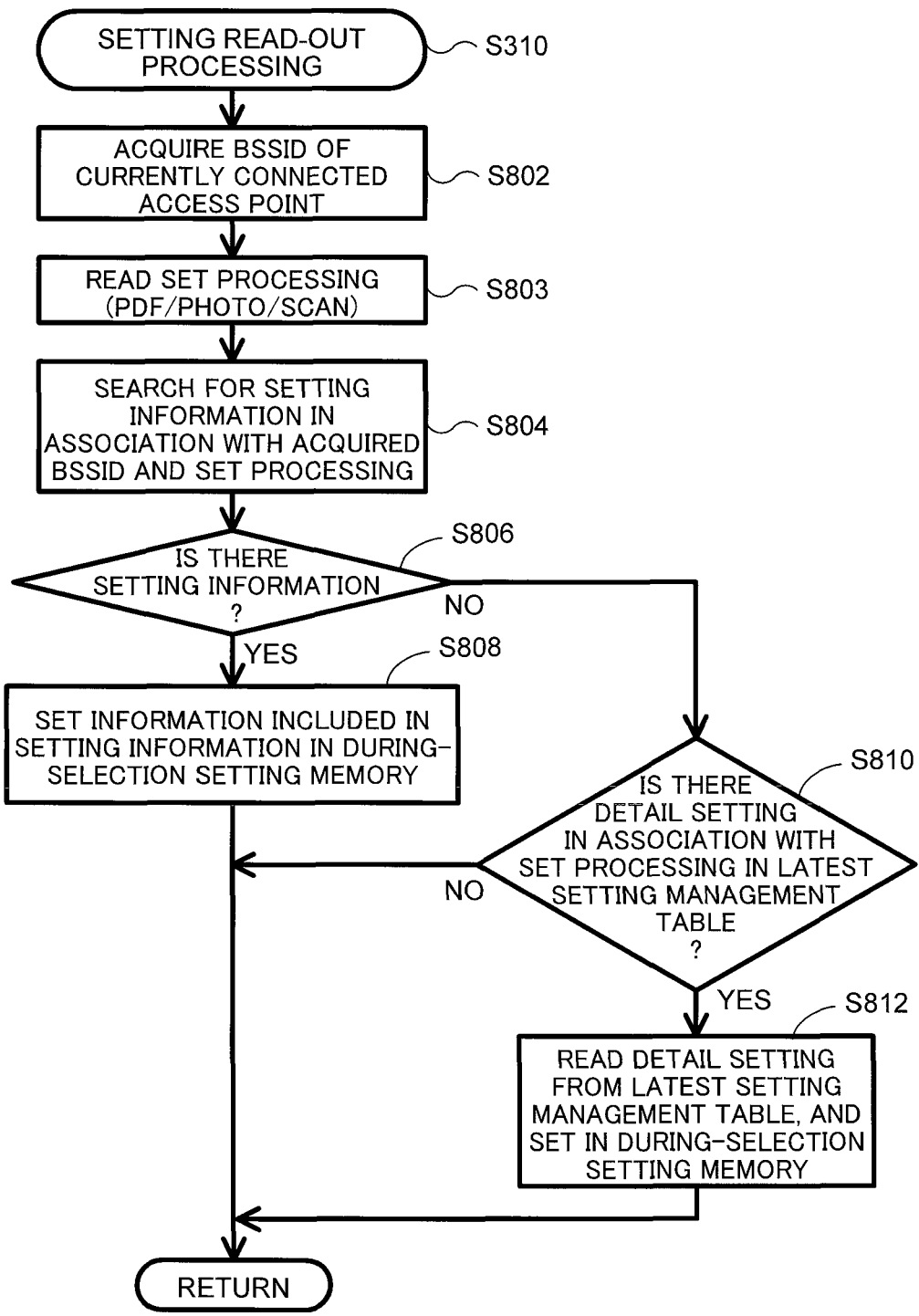
FIG. 8 is a flow chart showing setting read-out processing performed in the portable terminal of the third embodiment.

FIG. 7B is a flow chart showing setting storage processing performed by the CPU 11 according to the application 14b of the third embodiment, and FIG. 8 is a flow chart showing setting read-out processing (S310). The application 14b of the third embodiment may cause the CPU 11 to perform the setting storage processing shown in FIG. 7B instead of S318 in the device usage processing of the first embodiment. In addition, the application 14b of the third embodiment may cause the CPU 11 to perform the setting read-out processing shown in FIG. 8 instead, of the setting read-out processing of the first embodiment (S310). Other processing which the application 14b of the third embodiment causes the CPU 11 to perform may be similar to that of the first embodiment.

As shown in FIG. 7B, in the setting storage processing, the CPU 11 first may cause the setting information 60 to be stored, in the setting information management table 20a, within a region in association with the BSSID 61 of the connected access point 50 and the processing type 62 set in the during-selection setting memory 13b (as in the first embodiment, hereinafter referred to as set processing) (S702). The setting information 60 may include the device information 64 and the detail setting 66 set in the during-selection setting memory 13b and the time information 68.

Next, if, in the setting information management table 20a, within a region in association with the BSSID 61 of the connected access point 50, and another processing type 62 that is different from the set processing, there is a blank region, in other words, if, there is processing for which the setting information 60 has not been set for the connected access point 50 (S704: Yes), the CPU 11 may cause the setting information 60 to be stored in the blank region (S706). That is to say, the setting information 60 may be stored in association with the BSSID 61 of the connected access point 50 and the other processing type 62. However, here, the setting information 60 that is to be stored may include the device information 64 set in the during-selection setting memory 13b and the time information 68 representing the current date and time, but not the detail setting 66. Note that if, in the setting information management table 20a, within the region in association with the BSSID 61 of the connected access point 50 and the other processing type 62 that is different from the set processing, there is no blank region (S704: No), the CPU 11 skips the processing of S706.

Next, the CPU 11 may update a region corresponding to the set processing type 62 in the latest setting management table 20b with the detail setting 66 stored in the during-selection setting memory 13b (S708), and finishes the processing. That is to say, the detail setting 66 stored in association with the set processing type 62 may be overwritten by the latest detail setting 66.

FIG. 8 is a flow chart showing an example of setting read-out processing of the third embodiment. The setting read-out processing of the third embodiment may be performed instead of the setting read-out processing of the first embodiment. The CPU 11 may first acquire the BSSID of one of the connected access points 50 (S802), and may read the currently selected processing, namely, the set processing (S803).

Next, the CPU 11 may search for the setting information 60 stored in the setting information management table 20a in association with the acquired BSSID 61 and the set processing type 62 (S804). When the setting information 60 satisfying a condition is stored (S806: Yes), the CPU 11 may read from the setting information management table 20a the setting information 60 stored in association with the acquired BSSID 61 and the set processing type 62, and may set in the during-selection setting memory 13b, the device information 64 and the detail setting 66 included in the setting information 60 (S808). However, as described with reference to FIG. 7B, in the third embodiment, the setting information 60 may include, in one case, the device information 64 and the detail setting 66, and in another, the device information 64 but not the detail setting 66. Therefore, when no detail setting 66 is included in the setting information 60, only the device information 64 may be set in the during-selection setting memory 13b. The CPU 11 then returns to the processing of S312 (FIG. 3). In this case, when the device information 64 and the detail setting 66 are included in the setting information 60, as shown in FIG. 5A, the setting screen showing the state where the device information 64 and the detail setting 66 are preset may be displayed. Meanwhile, when no detail setting 66 is included in the setting information 60, as shown in FIG. 5B, the setting screen showing the state where only the device information 64 is preset may be displayed.

Meanwhile, when no setting information 60 in association with the acquired BSSID 61 and the set processing type 62 has been stored in the setting information management table 20a (S806: No), and when the detail setting 66 in association with the set processing type 62 has been stored in the latest setting management table 20b (S810: Yes), the CPU 11 may read from the latest setting management table 20b, the detail setting 66 in association with the set processing type 62, and may set the detail setting 66 in the during-selection setting memory 13b (S812). Then, the CPU 11 may return to the processing of S312 (FIG. 3). In this case, as shown in FIG. 5C, the setting screen showing the state where the detail setting 66 is preset may be displayed. Note that when no detail setting 66 in association with the set processing type 62 has been stored in the latest setting management table 20b (S810: No), the CPU 11 skips the processing of S812. In this case, the setting screen showing the state where no device information 64 and detail setting 66 are set may be displayed.

According to the third embodiment, when the setting information 60 (including the device information 64, the detail setting 66 and the time information 68) is stored in association with the BSSID 61 of the connected access point 50 and the set processing type 62, the setting information 60 (including the device information 64, but not the detail setting 66) may be also stored in association with the BSSID 61 thereof and another processing type 62. Thus, when the portable terminal 10 uses the same access point 50 the next time and onward, even if another processing is to be set, the device information 64 that was set when the access point 50 was connected in the past may be inherited and used.

In addition, according to the third embodiment, even if no setting information 60 has been stored in association with the BSSID 61 of the connected access point 50 and the set processing type 62, by using the latest detail setting 66 stored in the latest setting management table 20b, the appropriate detail setting 66 to the set processing may be inherited and used.

A fourth embodiment will be described with reference to FIGS. 9A to 9C. Note that the application 14b of the fourth embodiment may cause the CPU 11 to perform setting read-out processing shown in FIG. 9A instead of the setting read-out processing of the first embodiment (FIG. 4). In addition, the application 14b of the third embodiment may cause the CPU 11 to perform the setting storage processing of the third embodiment (FIG. 7B) instead of the processing of S318 included in the device usage processing of the first embodiment. Other processing which the application 14b of the fourth embodiment causes the CPU 11 to perform may be similar to that of the first embodiment.

Figure 9A:
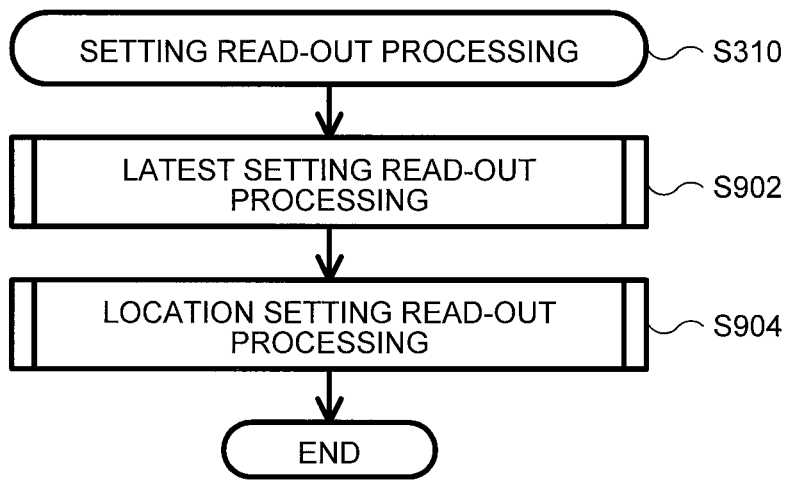
FIGS. 9A to 9C are flow charts each showing processing performed in a portable terminal of a fourth embodiment, FIG. 9A showing setting read-out processing, FIG. 9B showing latest setting read-out processing, FIG. 9C showing location read-out processing.
Figure 9B:
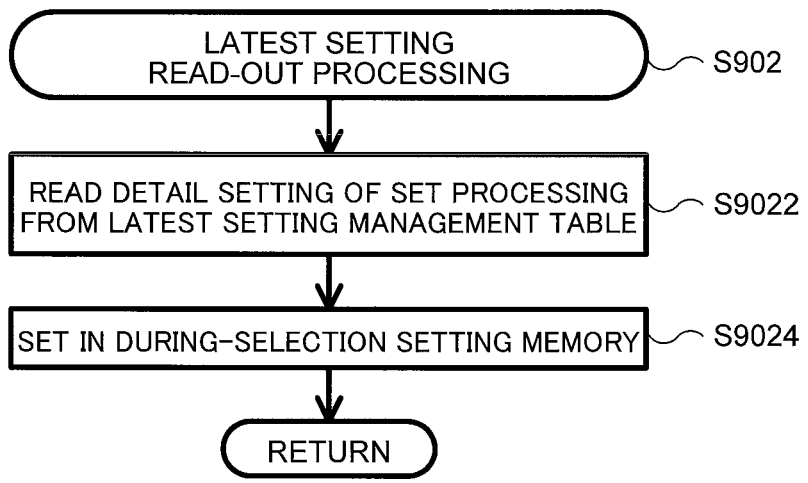
Figure 9C:
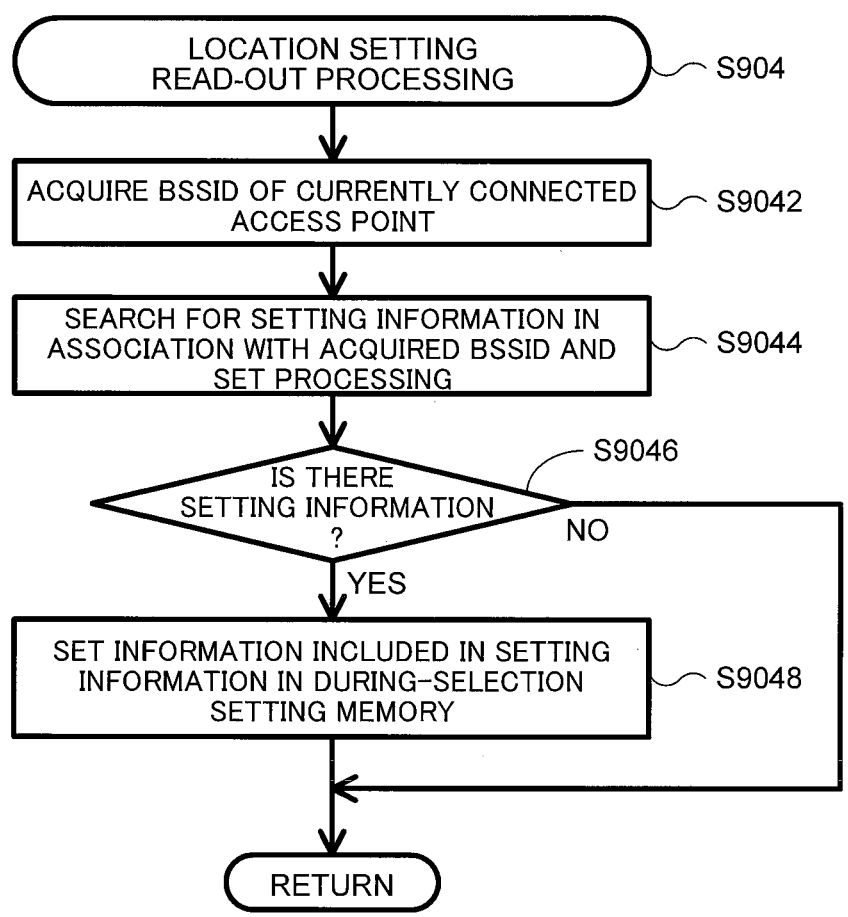

FIG. 9A is an example of the setting read-out processing (S310) performed by the CPU 11 according to the application 14b of the fourth embodiment. The CPU 11 may first perform the latest setting read-out processing (S902). FIG. 9B is a flow chart showing an example of the latest setting read-out processing (S902). In this processing, the CPU 11 may read from the latest setting management table 20b the detail setting 66 in association with the set processing (S9022), and sets the read detail setting 66 in the during-selection setting memory 13b, and then finishes the latest setting read-out processing (S9024).

Returning to FIG. 9A, the description is continued. Next, the CPU 11 may perform location read-out processing, (S904). FIG. 9C is a flow chart showing an example of the location read-out processing (S904). The CPU 11 may first acquire the BSSID 61 of the connected access point 50 through the wireless LAN transmitter-receiver 15 (S9042), and then may search for the setting information 60 in association with the BSSID 61 and the set processing type 62 (S9044).

When there is the setting information 60 satisfying a condition (S904: Yes), the CPU 11 may read from the setting information management table 20a the setting information 60, and may set the information acquired from the setting information 60 in the during-selection setting memory 13b (S9048), and then finishes the location read-out processing. Note that, as described with reference to FIG. 9C, in the fourth embodiment, the setting information 60 may include, in one case, the device information 64 and the detail setting 66, and in another, the device information 64 but not the detail setting 66.

When the setting information 60 includes the device information 64 and the detail setting 66, in the processing of S9048, the device information 64 and the detail setting 66 included in the setting information 60 may be set in the during-selection setting memory 13b. Therefore, the detail setting 66 set in the during-selection setting memory 13b in the latest setting read-out processing (S902) may be overwritten by the detail setting 66 in the setting information 60, thus, the device information 64 and the detail setting 66 acquired from the setting information 60 may be set in the during-selection setting memory 13b.

In addition, when the setting information 60 includes the device information 64 but not the detail setting 66, in the processing of S9048, only the device information 64 may be set in the during-selection setting memory 13b. Therefore, in the during-selection setting memory 13b, the device information 64 acquired from the setting information 60 and the detail setting 66 set in the latest setting read-out processing (S902) may be set.

Meanwhile, if there is no setting information 60 satisfying a condition (S9046: No), the CPU 11 skips the processing of S9048, and finishes the location read-out processing. In this case, in the during-selection setting memory 13b, only the detail setting 66 that is set in the latest setting read-out processing (S902) may be set, and the device information 64 may not be set.

According to the setting read-out processing of the fourth embodiment, the setting information 60 stored in the setting information management table 20a and the detail setting 66 stored in the latest setting management table 20h may be used to reduce the work load on the user, which is needed for the setting operation as in the first embodiment.

In the embodiments, the portable terminal 10 represents an example of an information processing apparatus. The device information 64 represents an example of specific information. The detail setting 66 represents an example of a processing setting value.

The CPU 11 represents an example of a computer, a processor, an acquiring portion, first to fourth read-out portions and first to fourth setting portions. The wireless LAN transmitter-receiver 15 represents an example of a connecting portion. The operation key 16 and the touch panel 17 are an example of an input portion. The memory card 20 represents an example of a first memory and a second memory. However, each portion including the acquiring portion, the first to fourth read-out portions, the first to fourth setting portions, the connecting portion, and the input portion may be discrete hardware, or hardware that operates by executing a program of the present invention or a program other than the present invention such as an operating system. In addition, each portion may be hardware that operates by combining processes by plural programs. Further, the first memory and the second memory may be a memory included in the portable terminal 10 such as the flash memory 14, or may be distributed.

S318, S602 and S702 represent examples of a first storing step. S402, S802 and S9042 represent an example of a first acquiring step. S408, S808 and S9048 represent an example of a first reading step and a first setting step. S412 represents an example of a fourth reading step and a fourth setting step. S416 represents an example of a second reading step and a second setting step. S706 represents an example of a third storing step. S708 represents an example of a second storing step. S812 and S9022 represent an example of a third reading step. S812 and S9024 represent an example of a third setting step.

Although the present invention has been described based on the embodiments, it will be understood readily by those skilled in the art that the present invention is not limited to the embodiments described above, and various changes and modifications may be made without departing from the spirit and scope of the invention.

For example, although in the embodiments, the portable terminal 10 represents an example of an information processing apparatus, examples of the image processing apparatus may include various devices such as a personal computer and a digital camera.

Furthermore, although in the embodiments, processing that the application 14b can instruct the device 30 to perform includes PDF printing, photo-printing and scanning, the application 14b may be configured to instruct to perform another processing including web printing, document scanning and image scanning.

Moreover, although several types of processing have been prepared for printing, and only one type has been prepared for scanning in the embodiments, several types for printing only or scanning only may be prepared. In addition, several types for scanning and one type for printing may be prepared.

In addition, although the device 30 performs printing and scanning in the embodiments, if the device is available via the access point 50, the device may perform only printing or scanning, and the device may be capable of performing other processing than printing and scanning.

Further, the embodiments have been described in which the device usage processing (FIG. 3) is performed when the user activates the application 14b on the portable terminal 10. However, when the OS 14a is the Android (registered trademark) OS, the device usage processing may be performed also when the application 14b is activated by selecting the application 14b as a common output destination of a common function of the Android.

Furthermore, although in the embodiments, the BSSID has been described as an example of identification information of the access point 50, without being limited thereto, the identification information may be an ESSID (Extended Service Set Identifier). The BSSID is a unique value in a network; on the other hand, the ESSID is a value that may be set by an administrator arbitrarily. When the present invention is applied with the BSSID serving as the identification information, setting can be inherited more strictly at each access point 50. On the other hand, when the present invention is applied with the ESSID serving as the identification information, setting can be inherited more flexibly. That is to say, even for the different access point 50, if the same ESSID (e.g., Home, Office) is set due to the uses being for similar purposes or the like, setting can be inherited for each of the ESSID.

Moreover, in the embodiments, changes of the device information 64 and the detail setting 66 based on a user operation are accepted. However, the application 14b may be configured to instruct the device 30 to perform processing without accepting the changes of the device information 64 and the detail setting 66 that are set using the setting information 60 read from the setting information management table 20a or the detail setting 66 read from the latest setting management table 20b.

In addition, the first embodiment has been described in such a way that when the setting information 60 is used which is in association with the BSSID 61 of the connected access point 50, and another processing type 62 that is different from the set processing (S412 of FIG. 4), only the device information 64 in the setting information 60 is inherited. However, the application 14b may be configured to inherit the device information 64 and the detail setting 66. This is because, for example, when printing an image via a home access point 50, there are cases where the valid detail setting 66 may be inherited regardless of PDF processing or photo-printing such as executing monochrome printing.

Similarly, the third and fourth embodiments have been described in such a way that when the setting information 60 is stored in association with the BSSID 61 of the connected access point 50, and another processing type 62 (S706 of FIG. 7B), the setting information 60 includes the device information 64 but not the detail setting 66. However, the application 14b may be configured to store the device information 64 and the detail setting 66 in the setting information 60.

Further, in the embodiments, each region in the setting information management table 20a is blank before the setting information 60 is written. However, for example, the setting information 60 including the default detail setting 66 may be written in advance in each region in the setting information management table 20a. In that case, in the fourth embodiment, when the device information 64 and the detail setting 66 read from the setting information management table 20a are set in the during-selection setting memory 13b (S9048 of FIG. 9C), if the detail setting 66 is default, only the device information 64 may be set in the during-selection setting memory 13b. This may prevent the detail setting 66 read from the latest setting management table 20b and written in the during-selection setting memory 13b in the previous latest setting read-out processing (S902) from being overwritten by the default detail setting 66.

Moreover, when the detail setting 66 is used, which is in association with the BSSID 61 of another access point 50 that is different from the connected access point 50, and in association with the processing set in the selected processing memory 13a, sometimes the detail setting 66 may not be used directly. This may be the case when, for example, color printing cannot be performed in the device available via the connected access point 50 but color printing can be performed in the device available via another access point 50. In this case, among the detail settings 66 in association with other access points 50, a setting (e.g., color printing) that cannot be performed in the device via the connected access point 50 may be automatically changed to the default setting (e.g., monochrome printing).

In addition, in the third and fourth embodiments, no time information 68 may be stored in the setting information management table 20a.

Figure 10:
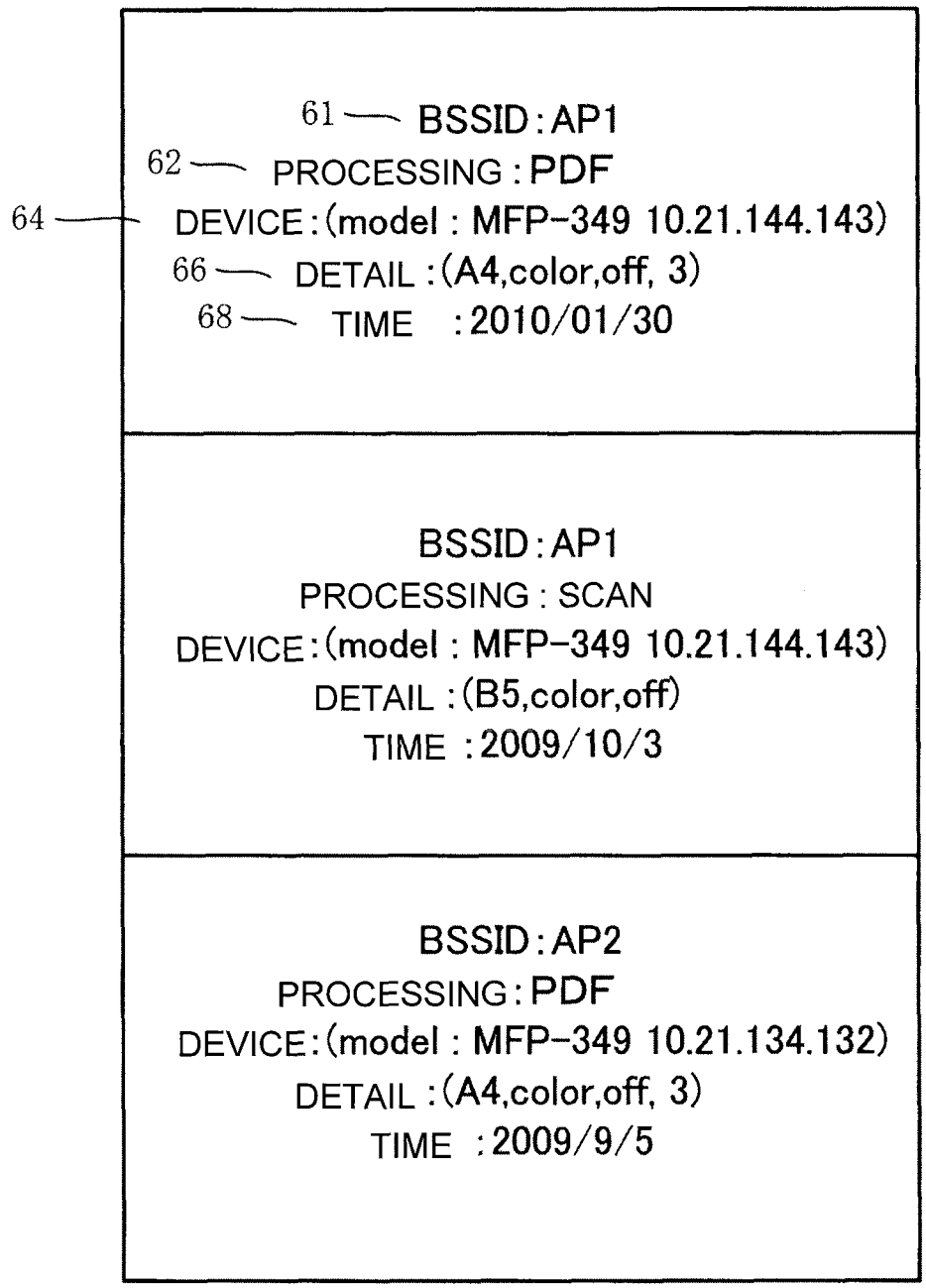
FIG. 10 is a diagram showing an example of setting information stored in a memory card when the setting information is stored without a setting information management table in a portable terminal according to a variation.

Furthermore, a table such as the setting information management table 20a may not be used to store setting information. For example, as shown in FIG. 10, a log (setting information) including the BSSID 61, the processing type 62, the device information 64, the detail setting 66 and the time information 68 may be stored. In that case, for each combination of the BSSID 61 and the processing type 62, only the latest log may be stored or plural logs may be stored.

What is claimed is:

1. An information processing apparatus comprising:
a communication unit communicable with a device via an access point which relays communication data; and
a controller configured to:
store, in a first storage portion, setting information that is set for a predetermined type of processing, of a plurality of types of processing, that the device is configured to perform, the setting information being stored in association with identification information of an access point to which the communication unit is connected and with a plurality of pieces of processing that includes at least one of printing and scanning;
acquire the identification information of the access point to which the communication unit is connected;
read the setting information stored in association with the identification information of the access point acquired from the first storage portion and with a selected one of the plurality of pieces of processing, the setting information including at least one of specifying information for specifying the device and a setting value of the predetermined type of processing;

set the type of processing to be performed by the device based on the read setting information corresponding to the access point; and set the selected one of the plurality of pieces of processing by using the read setting information.

2. The information processing apparatus according to claim 1, wherein
the plurality of pieces of processing includes a plurality of types of printing.

3. The information processing apparatus according to claim 1, wherein
the plurality of pieces of processing includes a plurality of types of scanning.

4. The information processing apparatus according to claim 1, wherein
the controller is further configured to read, from the first storage portion, at least the setting value included in the setting information in association with another identification information that is different from the acquired identification information of the access point and the selected one of the plurality of pieces of processing, and configured to set the selected one of the plurality of pieces of processing by using the read setting value.

5. The information processing apparatus according to claim 4, wherein
the setting value is included in latest setting information stored in the first storage portion.

6. The information processing apparatus according to claim 1, wherein
the controller is further configured to:
store, in a second storage portion, the setting value set for the predetermined type of processing in association with the predetermined type of processing;
read the setting value, which is stored in the second storage portion, in association with the selected one of the plurality of pieces of processing; and
set the selected one of the plurality of processing by using the read setting value.

7. The information processing apparatus according to claim 1, wherein
the controller is further configured to:
read, from the first storage portion, specifying information of at least the device among setting information in association with the acquired identification information of the access point and processing that is different from the selected one of the plurality of pieces of processing; and
set the selected one of the plurality of pieces of processing using the read specifying information of the device.

8. The information processing apparatus according to claim 1, wherein
the controller is configured to store, when selection of a device connected to the access point and a setting value are inputted, setting information including specifying information of the device and the inputted setting value in association with the acquired identification information and the selected one of the plurality of pieces of processing,
the controller is further configured to store, in the first storage portion, the specifying information of the device in association with the acquired identification information and processing other than the selected one of the plurality of pieces of processing.

9. An information processing method for an information processing apparatus comprising a communication unit communicable with a device via an access point which relays communication data, the information processing method comprising:
storing, in a first storage portion, setting information that is set for a predetermined type of processing, of a plurality of types of processing, that the device is configured to perform, the setting information being stored in association with identification information of an access point to which the communication unit is connected and with a plurality of pieces of processing that includes at least one of printing and scanning;
acquiring the identification information of the access point to which the communication unit is connected;
reading the setting information stored in association with the identification information of the access point acquired from the first storage portion and with a selected one of the plurality of pieces of processing, the setting information including at least one of specifying information for specifying the device and a setting value of the predetermined type of processing;
setting the type of processing to be performed by the device based on the read setting information corresponding to the access point; and
setting the selected one of the plurality of pieces of processing by using the read setting information.

10. A non-transitory computer-readable recording medium storing a program for an information processing apparatus comprising a communication unit communicable with a device via an access point which relays communication data, the program, when executed by a processor, causes the information processing apparatus to execute:
a first storing step of storing, in a first storage portion, setting information that is set for a predetermined type of processing, of a plurality of types of processing, that the device is configured to perform, the setting information being stored in association with identification information of an access point to which the communication unit is connected and with a plurality of pieces of processing that includes at least one of printing and scanning;
a first acquiring step of acquiring the identification information of the access point to which the communication unit is connected;
a first reading step of reading the setting information stored in association with the identification information of the access point acquired from the first storage portion and with a selected one of the plurality of pieces of processing, the setting information including at least one of specifying information for specifying the device and a setting value of the predetermined type of processing;
a first setting step of setting the type of processing to be performed by the device based on the read setting information corresponding to the access point,
wherein the first setting step further includes setting the selected one of the plurality of pieces of processing by using the read setting information.

11. The recording medium to claim 10, wherein
the program, when executed by a processor, causes the information processing apparatus to further execute:
a second reading step of reading, from the first storage portion, at least the setting value included in the setting information in association with another identification information that is different from the acquired identification information of the access point and the selected one of the plurality of pieces of processing; and
a second setting step of setting the selected one of the plurality of pieces of processing by using the read setting value.

12. The recording medium according to claim 11, wherein the setting value is included in latest setting information stored in the first storage portion.

13. The recording medium according to claim 10, wherein the program, when executed by a processor, causes the information processing apparatus to further executes:
   a second storing step of storing, in a second storage portion, the setting value set for the predetermined type of processing in association with the predetermined type of processing;
   a third reading step of reading the setting value, which is stored in the second storage portion, in association with the selected one of the plurality of pieces of processing; and
   a third setting step of setting the selected one of the plurality of pieces of processing by using the read setting value.

14. The recording medium according to claim 10, wherein the program, when executed by a processor, causes the information processing apparatus to further executes:
   a fourth reading step of reading, from the first storage portion, specifying information of at least the device among setting information in association with the acquired identification information of the access point and processing that is different from the selected one of the plurality of pieces of processing; and
   a fourth setting step of setting the selected one of the plurality of pieces of processing using the read specifying information of the device.

15. The recording medium according to claim 10, wherein the first storing step of storing includes storing, when selection of a device connected to the access point and the setting value are inputted, setting information including specifying information of the device and the inputted setting value in association with the acquired identification information and the selected one of the plurality of pieces of processing, and
the program, when executed by a processor, causes the information processing apparatus to further executes a third step of storing, in the first storage portion, the specifying information of the device in association with the acquired identification information and processing other than the selected one of the plurality of pieces of processing.

* * * * *